Aug. 22, 1961  R. D. RUMSEY ET AL  2,997,140
ROTARY DAMPER
Filed July 8, 1957

Inventors
Rollin D. Rumsey
William J. Carter
by Hill, Sherman, Meroni, Gross & Simpson
Attys

United States Patent Office 2,997,140
Patented Aug. 22, 1961

2,997,140
ROTARY DAMPER
Rollin Douglas Rumsey, Buffalo, and William J. Carter, Kenmore, N.Y., assignors to Houdaille Industries, Inc., Buffalo, N.Y., a corporation of Michigan
Filed July 8, 1957, Ser. No. 670,515
2 Claims. (Cl. 188—93)

This invention relates to improvements in dampers and more particularly relates to dampers adapted to control vibration and the flutter of aircraft and the like.

A principal object of the invention is to provide an improved form of damper of the rotary type automatically compensating for temperature variations and accommodating the damping strength to be selectively varied.

Still another object of the invention is to provide a new and improved form of adjustable temperature compensating flutter damper arranged with a view toward utmost simplicity, compactness and ease of manufacture.

A still further object of the invention is to provide a simplified form of rotary damper in which temperature changes are compensated for and the damping strength is selectively varied by providing orifice control valves arranged in parallel, one compensating for variations in temperature and the other controlling the damping strength of the damper.

A still further object of the invention is to provide a rotary damper wherein a rotary vane piston and cylinder move relatively with respect to each other to damp out the vibration of the movable parts of aircraft, wherein damping effort is maintained constant for each direction of damping over a wide range of temperature variations by the provision of a temperature compensating orifice control valve, wherein damping strength may be selectively varied by a second orifice control valve, and wherein the valves are connected with opposed damping chamber in parallel by balancing ports connected between complemental working chambers of the damper and damping ports connected between opposed working chambers of the damper through the two orifice control valves.

Figure 1:
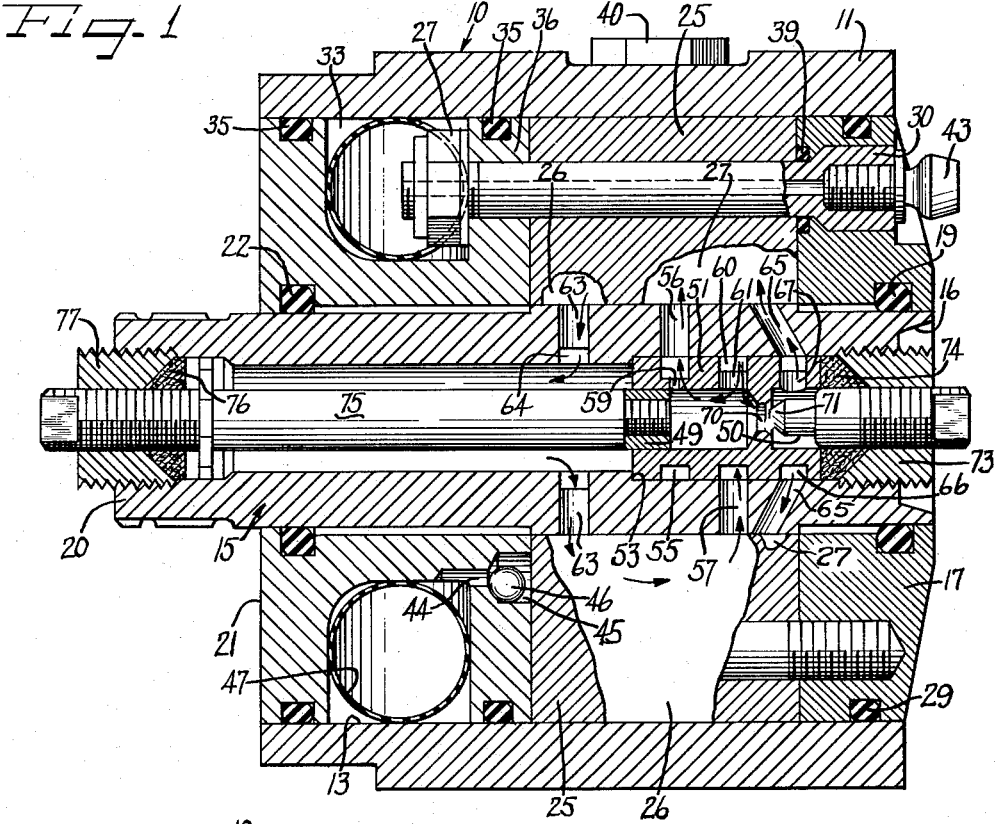
Figure 2:
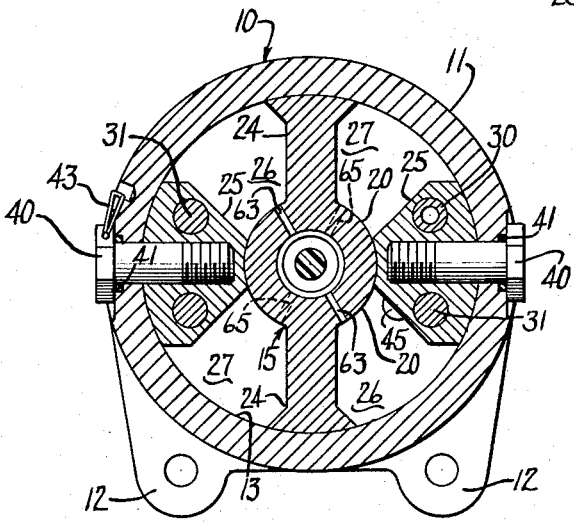

These and other objects of the invention will appear from time to time as the following specification proceeds and with reference to the accompanying drawings wherein:

FIGURE 1 is a schematic longitudinal sectional view taken through a rotary damper constructed in accordance with the invention; and FIGURE 2 is a transverse sectional view of the damper taken through one pair of balancing ports.

In the embodiment of the invention illustrated in the drawing, reference character 10 designates generally a damper of the rotary piston type capable of damping the tendency of the structural assemblies of aircraft to flutter. The damper 10 comprises a cylindrical housing 11, which may be mounted coaxially with the hinge axis of a pivoted airfoil member and which has attachment flanges 12 for rigidly securing the housing to the movable control member of the airplane, for rocking movement about the axis of movement of the control member, as the latter tends to swing or flutter.

The damper 10 is a rotary vane hydraulic piston type of damper operating on the principle of the absorption of the energy by metered valve control of the displacement of the hydraulic fluid between opposed working chambers of the damper, and permitting intentional movement of the control structure, but resisting vibrational or sudden or rapid movements of the control structure.

The housing 11 is open at its ends and has an interior cylindrical wall 13 extending for the length thereof and defining a damping chamber within which is mounted a rotary vane piston or wing shaft 15. The rotary vane piston 15 has a shaft portion 16 rotatably carried in an end plate 17 of the housing 11 and sealed thereto as by an O-ring 19. The rotary vane piston 15 also has an opposite shaft portion 20 substantially longer than the shaft portion 16 and extending through a chambered member 21 forming an opposite end closure member of the housing 11 from the end closure member 17. The shaft 20 extends to the outside of said chambered member 21 and is shown in FIGURE 1 as being splined for attachment to a stationary portion of the air foil member. An O-ring seal 22 is provided to seal the shaft portion 20 to the interior of the chambered member 21.

The rotary piston 15 is shown as having diametrically opposed wings or vanes 24 extending therefrom and conforming to and slidably engaging the cylindrical wall 13 of the housing 11 between the end plate 17 and chambered member 21. Mounted within the housing 11 and secured to the wall 13 between the wings 24 in diametrically opposed relation with respect to each other are fluid reaction dividers or abutments 25, conforming to the cylindrical wall 13 and slidably engaging the cylindrical surface of the wing shaft 15 between the vanes 24 thereof. The fluid reaction abutments with the vanes 24 thus divide the chamber defined by the cylindrical wall 13 into two complemental working chambers 26 and 27, the complemental working chambers 26 operating in opposed relationship to the complemental working chambers 27 and vice versa.

The end plate 17 is sealed to the wall of the housing 13 as by an O-ring seal 29 and is secured to the abutments 25 in abutting engagement with end faces thereof, as by a hollow through bolt 30 and threaded studs 31.

The chambered member 21 abuts the opposite faces of the abutments 25 from the end plate 17, and is shown as having an annular chamber 33 extending thereabout and opening to the cylindrical wall 13 and sealed thereto as by annular seals, such as O-rings 35 on opposite sides of the chamber 33.

The through bolt 30 extends through the end plate 17, an abutment 25 and through an inner leg 36 of the chambered member 21 and is maintained in connected relation with respect to the abutment 25 by a nut 37 threaded on the inner end thereof within the chamber 33 and engaging the outer face of the leg 36.

It should be understood that in assembling the damper, the wing shaft 15 may first be assembled and sealed to the end plate 17. The studs 31 may then locate the abutments 25 on the end plate 17. The through bolt 30 may then be placed on the end plate 17 and through an abutment 25 and may be sealed to the end plate 17, as by an O-ring 39. The chambered member 21 may then be placed on the through bolt 30 and the studs 31. The nut 37 may then be threaded on the through bolt 30 and similar nuts (not shown) may be threaded on the studs 31. The nuts may then be tightened to assemble the unit for mounting within the housing 11 in engagement with the cylindrical wall 13 thereof. Radially extending cap or machine screws 40 may then extend through the wall of the housing 11 and be threaded within the abutments 25, for retaining the parts of the damper in connected relation with respect to each other. The cap screws 40 are shown as being sealed to the wall of the housing 11 as by O-rings 41. Lock wires 43 may be provided to lock the cap screws 40 in position.

The through bolt 30 is shown as being hollow and as having a lubricant fitting 43 threaded in the outer end thereof, for supplying damping fluid to the chamber 33 and the working chambers 26 and 27 of the damper. The fitting 43 may be a well-known form of Alemite fitting having a check valve (not shown) therein, to block the back flow of fluid out through the fitting.

The chamber 33 has a passageway 44 leading therefrom to a check valve chamber 45 opening to the damping chamber 26 adjacent an abutment 25. A ball type check valve 46 is shown as being mounted in the check valve chamber 45, to block the back flow of damping fluid into the chamber 33 upon operation of the damper. As herein shown, the check valve chamber 45 opens to an abutment 25 and is sufficiently covered by the abutment to enable the abutment to retain the check valve 46 to the chamber 45 but to accommodate the filling of the damping chambers 26 and 27 through the passageway 44.

The replenishing chamber 33 is shown as being pressurized by a plurality of resilient members 47 which may be toroidal in form or may be in the form of balls. Said members 47 may be made from an elastomer or like resilient material, which is unaffected by the hydraulic damping fluid. The members 47 are herein shown as being hollow, although they need not be hollow, but may be made from a sponge material or any other resilient material that contracts upon the filling of the chamber 33 with sufficient pressure to pressurize said members 47, and tends to expand to supply the pressure to replenish damping fluid in the damping chambers 26 and 27 during operation of the damper.

Fluid under pressure is displaced from the working chambers 26 to the working chambers 27 and vice versa upon relative movement between the housing 11 and wing shaft 15 under the control of a temperature compensating orifice control valve 49 and a damper strength control valve 50, extending within a spool 51, mounted in the hollow interior of the wing shaft 15.

As herein shown, the spool 51 abuts a shoulder 53 in the hollow interior of the wing shaft 15 and has an annular groove 55 extending thereabout and opening to the outside thereof and having communication with a displacement port 56 communicating with a damping chamber 27. An orifice 59 leads from the annular passageway 55 to the interior of the spool 51 and provides a damping orifice under control of the temperature compensating valve 49.

An annular passageway or groove 60 is formed in the periphery of the spool 51 and spaced to the right of the groove 55 and has communication with the hollow interior of the spool 51 through a passageway 61. The annular groove 60 also has communication with a displacement port 57 connected with a damping chamber 26.

The damping chambers 26 are connected together by balancing passageways 63 leading radially through the piston 15 from the chambers 26 and opening to an annular groove 64 formed in the piston 15 and opening to the hollow interior thereof.

The chambers 27 are connected together by balancing passageways 65 leading through the wing shaft 15 to the hollow interior thereof and having communication with an annular passageway 66 leading about the spool 51 and spaced to the right of the annular passageway 60. A passageway 67 leads from the annular groove or passageway 66 to the hollow interior of the spool 51 and affords communication with the hollow interior of said spool and the displacement ports 56 and 57 under control of the orifice control valves 49 and 50.

The spool 51 has an orifice 70 extending axially of the center thereof, the cross sectional area of which is controlled by the tapered end 71 of the orifice control valve 50. The orifice control valve 50 is shown as being threaded within a gland nut 73 threaded within the hollow interior of the shaft portion 16 of the rotary piston 15. The inner end of the gland nut 73 engages a packing member 74 and maintains the packing member in engagement with the end of the spool 51 and seals the right hand end of the hollow interior portion of the wing shaft 15. The valve 50 thus is turned by a wrench or like device to vary the position of the conical end 71 thereof with respect to the orifice 70 and to thereby vary the damping strength of the damper as required to effect the desired damping strength.

The orifice control valve 49 is in the form of a sleeve threaded on the end of a linearly expansible rod 75. The inner end of the valve 49 is normally adjacent the orifice 59 and moves along the hollow interior of the spool 51 by expansion or contraction of the rod 75, as the temperature varies from a mean temperature, to provide a linear increase in damping with speed over a wide range of temperature variations. The linearly expansible rod 75 may be made from any material having a higher rate of linear expansion than the shaft portion 20 of the wing shaft 15 and the spool 51, and is preferably made from a nylon or like thermoplastic material.

The rod 75 is shown as extending along the hollow interior of the shaft portion 20 of the wing shaft 15 through a sealing gland 76 sealing the hollow interior of the wing shaft 15. The rod 75 is threaded within a gland nut 77 which is also threaded within the outer end of the shaft portion 20 of the wing shaft 15.

In operation of the damper when the damper is operating in a direction to restrict the damping chambers 26, damping fluid is displaced from the damping chamber 26, shown in FIGURE 1 as being the upper damping chamber, through the communicating equalizing port 63 to the hollow interior of the wing shaft 15 around the expansible rod 75. Damping fluid is also displaced from the hollow interior of the wing shaft 15 through the lower displacement port 63 into the lower damping chamber 26. Fluid in the lower damping chamber 26 is displaced through the displacement port 57 to the hollow interior of the spool 51 through the annular passageway 60 and the radial passageway 61. The damping fluid in the hollow interior of the spool 51 will then be divided, part of the damping fluid being displaced through the temperature compensated damping orifice 59 and the rest of the damping fluid being displaced through the damping strength orifice 70 under the control of the respective valves 49 and 50. Fluid will then pass into the damping chambers 27 through the displacement port 56 and equalizing ports 65 respectively.

Upon reverse operation of the damper to restrict the damping chambers 27, fluid is displaced from the damping chambers 27 through the displacement port 56 and the equalizing ports 65 and through the orifices 59 and 70 under the control of the respective valves 49 and 50 through the displacement port 57 into one complemental chamber 26 and of increasing volume through one equalizing port 63 into the hollow interior of the piston 15 along the temperature compensating rod 75 and through the opposite equalizing port 63 into the second damping chamber of increasing volume.

Thus, with the port arrangement shown, it is only necessary to provide one set of displacement ports for each set of working chambers 26 and 27, the balancing ports 63 and 65 connecting the respective working chambers 26 and 27 together and balancing the condition in the chambers 26 and 27 in each direction of operation of the damper 9 and providing the same hydraulic flow path and torque output when the damper is rotated in either a clockwise or a counterclockwise condition.

Thus in each direction of rotation of the damper a controlled damping effect is attained through the damping orifices 59 and 70 under the control of respective valves 49 and 50, the valve 50 determining the damping strength and the valve 49 compensating for variations in temperature and providing the same damping effect with a substantially linear increase in damping strength with speed over a wide range of temperature variations.

It should here be noted that the temperature compensating rod 75 is in direct heat transfer relation with the damping fluid, as the fluid passes from one chamber 26 through an associated equalizing port 63 about the rod 75 and out the opposite equalizing port 63 into the opposite chamber 26.

The temperature of the damping fluid is, therefore, communicated directly to the temperature compensating rod 75, resulting in instant response of said rod to changes in temperature of the damping fluid and avoiding the long delays in response to changes in temperature of the damping fluid, heretofore present in former dampers, and therefore providing a more constant performance of the damper over a wide range of variations in temperature.

It should also be understood that while the temperature compensating and damping orifices are herein shown as being in parallel, that they may be in series as well.

Where the temperature compensating and damping orifices are in parallel, temperature compensation is effective at high damping levels where the damping orifice 70 is nearly closed.

Where, however, conditions are such that it is required that the orifice 70 be wide open the temperature compensating orifice control valve 49 may be connected in series with the damper strength control valve 50. This results in an increase in the effectiveness of the temperature compensation orifice control valve 49 at low damping strengths and thereby assures adequate temperature compensation at low damping levels.

It will be understood from the foregoing that various modifications and variations in the present invention may be effected without departing from the spirit and scope of the novel concepts thereof.

We claim as our invention:

1. In a damper of the character described, a housing having an inner wall defining a cylindrical chamber, a hollow rotary piston within said chamber having vanes slidably engageable with said inner wall, a plurality of fluid reaction abutments extending inwardly from said inner wall and rigidly mounted in said housing in the spaces between said vanes, the spaces between said abutments and vanes defining a plurality of pairs of working chambers, a hollow spool within said piston having a radial damping orifice leading from the hollow interior thereof and having an axial damping orifice leading from an end of said spool, an orifice control valve within said spool in association with said radial damping orifice, a temperature compensating member fixed at one end to said piston and extending along the hollow interior of said piston and having connection with said orifice control valve at its opposite end, a damping strength orifice control valve fixed to said piston and extending therein in association with said axial damping orifice, a first fluid displacement port affording communication between said radial orifice in one of said working chambers, a second fluid displacement port affording communication between the hollow interior of said spool and said radial and axial orifices and a second pair of said working chambers, and equalizing passageway means affording communication between each pair of said working chambers through the hollow interior of said piston, one equalizing passageway means being spaced from one end of said spool and connecting one pair of working chambers together and the other equalizing passageway means being spaced from the opposite end of said spool and connecting another pair of working chambers together.

2. In a damper of the character described, a housing having an inner wall defining a cylindrical chamber, a rotary piston within said chamber having vanes slidably engageable with said inner wall, a plurality of fluid reaction abutments extending inwardly from said inner wall and rigidly mounted in said housing in the spaces between said vanes, the spaces between said abutments and vanes defining a plurality of pairs of working chambers, a hollow spool within said piston and having a radial damping orifice leading therethrough from the hollow interior of said spool and also having an axial damping orifice leading from an end of said spool, a temperature compensating orifice control valve associated with said radial damping orifice, a temperature compensating member extending along the hollow interior of said piston in inwardly spaced relation with respect thereto and having connection with an outer end of said piston at one end and with said orifice control valve at its opposite end, a damping strength orifice control valve extending within the opposite end of said piston from said temperature compensating member and mounted in said piston in association with said axial damping orifice, means for adjusting said damping strength orifice control valve in accordance with a selected damping strength of the damper, a first fluid displacement port affording communication between said radial damping orifice and one of said working chambers, a second fluid displacement port affording communication between the hollow interior of said spool between said radial and axial damping orifices and a second of said working chambers operating oppositely from said one working chamber, a pair of equalizing ports leading from one pair of working chambers to the hollow interior of said piston in spaced relation with respect to one end of said spool, a second pair of equalizing ports leading from a second pair of working chambers to the hollow interior of said piston in spaced relation with respect to the opposite end of said spool from said first mentioned equalizing ports, one pair of equalizing ports passing damping fluid along said temperature compensating member and each pair of equalizing ports cooperating with an associated fluid displacement port to effect the displacement of fluid from one pair of working chambers to the other through said radial and said axial orifices in parallel, in each direction of rotation of said damper.

References Cited in the file of this patent

UNITED STATES PATENTS

| | | |
|---|---|---|
| 435,678 | Blount | Sept. 2, 1890 |
| 1,876,092 | Sussin | Sept. 6, 1932 |
| 1,914,677 | Shultz | June 20, 1933 |
| 2,138,511 | Robbins | Nov. 29, 1938 |
| 2,286,516 | Swanson | June 16, 1942 |
| 2,683,505 | Girard | July 13, 1954 |
| 2,800,203 | Beyer | July 23, 1957 |
| 2,808,131 | Heckethorn | Oct. 1, 1957 |
| 2,818,142 | Beaumont | Dec. 31, 1957 |
| 2,851,128 | Kuhn | Sept. 9, 1958 |